US010382551B2

(12) United States Patent
Yang

(10) Patent No.: US 10,382,551 B2
(45) Date of Patent: Aug. 13, 2019

(54) CLOUD FILE PROCESSING METHOD AND APPARATUS

(71) Applicant: ALIBABA GROUP HOLDING LIMITED, George Town, Grand Cayman (KY)

(72) Inventor: Yehui Yang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/338,178

(22) Filed: Oct. 28, 2016

(65) Prior Publication Data

US 2017/0126806 A1 May 4, 2017

(30) Foreign Application Priority Data

Oct. 30, 2015 (CN) .......................... 2015 1 0728030

(51) Int. Cl.
*G06F 15/16* (2006.01)
*H04L 29/08* (2006.01)
*G06F 16/182* (2019.01)
*G06F 3/06* (2006.01)

(52) U.S. Cl.
CPC ........ *H04L 67/1097* (2013.01); *G06F 16/182* (2019.01); *H04L 67/06* (2013.01); *H04L 67/32* (2013.01); *G06F 3/067* (2013.01)

(58) Field of Classification Search
CPC ...... H04L 67/1097; H04L 67/06; H04L 67/32
USPC ................................................ 709/217, 203
See application file for complete search history.

(56) References Cited

U.S. PATENT DOCUMENTS

| 6,918,113 | B2 | 7/2005 | Patel |
| 6,959,320 | B2 | 10/2005 | Shah et al. |
| 7,043,524 | B2 | 5/2006 | Shah et al. |
| 7,062,567 | B2 | 6/2006 | Benitez et al. |
| 8,180,851 | B1 | 5/2012 | CaveLie |
| 8,204,966 | B1 | 6/2012 | Mendis |
| 8,788,628 | B1 | 7/2014 | Taylor et al. |
| 8,805,951 | B1 | 8/2014 | Faibish et al. |

(Continued)

OTHER PUBLICATIONS

PCT International Search Report and Written Opinion dated Jan. 17, 2017, issued in corresponding International Application No. PCT/US2016/059561 (10 pages).

(Continued)

*Primary Examiner* — Philip B Tran
(74) *Attorney, Agent, or Firm* — Finnegan, Henderson, Farabow, Garrett & Dunner, LLP

(57) ABSTRACT

Apparatuses and methods are disclosed for cloud file processing. An exemplary method may include acquiring a position of a first data packet read by the client in the target file as a reading position when a target file that a client intends to read from a cloud server is divided into a plurality of data packets. The method may also include acquiring a state of a second data packet not at the reading position in the target file as a peripheral state. The peripheral state is a read-completed state or an unread state. When the reading position and the peripheral state meet a preset condition, the method may further include sending, by the client, a data pre-fetch request to the cloud server. The data pre-fetch request is used to request to read, from the cloud server, a preset amount of data packets whose peripheral states are unread states in the target file.

23 Claims, 5 Drawing Sheets

(56) References Cited

U.S. PATENT DOCUMENTS

| | | | |
|---|---|---|---|
| 8,966,000 | B2 | 2/2015 | Ganapathy et al. |
| 9,137,293 | B2 | 9/2015 | Chang |
| 2003/0051055 | A1 | 3/2003 | Parrella |
| 2005/0091222 | A1 | 4/2005 | Serlet et al. |
| 2009/0055471 | A1 | 2/2009 | Kozat et al. |
| 2011/0208808 | A1 | 8/2011 | Corbett |
| 2011/0252071 | A1 | 10/2011 | Cidon |
| 2011/0258378 | A1 | 10/2011 | Ananthanarayanan |
| 2013/0073691 | A1 | 3/2013 | Quan et al. |
| 2013/0110778 | A1 | 5/2013 | Taylor et al. |
| 2013/0117240 | A1 | 5/2013 | Taylor et al. |
| 2014/0006354 | A1 | 1/2014 | Parkison et al. |
| 2014/0019498 | A1 | 1/2014 | Cidon et al. |
| 2014/0223099 | A1 | 8/2014 | Kidron |
| 2014/0229582 | A1 | 8/2014 | Liu et al. |
| 2015/0215816 | A1 | 7/2015 | Abou-Elkheir |
| 2015/0281390 | A1* | 10/2015 | Kovvuri ............... H04L 67/06 709/203 |

OTHER PUBLICATIONS

European Search Report and Supplementary European Search Report for European Patent Application No. EP 16 86 0995, dated Aug. 8, 2018, issued in corresponding International Application No. PCT/US2016059561 (11 pages).

\* cited by examiner

CLOUD FILE PROCESSING METHOD AND APPARATUS

CROSS REFERENCE TO RELATED APPLICATION

The present application claims the benefits of priority to Chinese Application No. 201510728030.9, filed Oct. 30, 2015, the entire contents of which have been incorporated herein by reference.

TECHNICAL FIELD

The present disclosure relates to the field of data processing technologies, and in particular, to cloud file processing methods and apparatuses.

BACKGROUND

Cloud storage is an emerging technology that uses functions such as the cluster application, grid technology, or a distributed file system to gather numerous storage devices of different types in a network through application programs to jointly provide external data storage and remote access services. The cloud storage has a wide application prospect.

In existing technologies, a typical cloud system may include a client, a cloud server that manages numerous storage devices, and a network connecting the client and the cloud server. A user using the typical cloud system may acquire desired data from the cloud server by using the client to perform the following steps:

S1: the client reads, through the network, a target file located in the cloud server; and S2: the client caches, locally in real time, relevant data of the target file read from the cloud server, for the user to refer to.

In the existing technology, the client caches the relevant data of the target file for the user to refer to by reading data from the cloud server through the network. If some problems affecting transmission occur during data transmission (e.g., a network delay), the efficiency of data read by the client from the cloud server may decrease and the user may not receive the desired data in time.

SUMMARY

An objective of the present disclosure is to provide a cloud file processing method and apparatus, so that a client can provide relevant data of a target file in time for a user to refer to.

In one aspect, to solve the aforementioned technical problem, the present disclosure provides a cloud file processing method. The method may include acquiring a position of a first data packet read by the client in the target file as a reading position when a target file that a client intends to read from a cloud server is divided into a plurality of data packets. The method may also include acquiring a state of a second data packet not at the reading position in the target file as a peripheral state. The peripheral state is a read-completed state or an unread state. When the reading position and the peripheral state meet a preset condition, the method may further include sending, by the client, a data pre-fetch request to the cloud server. The data pre-fetch request is used to request to read, from the cloud server, a preset amount of data packets whose peripheral states are unread states in the target file.

In another aspect, the present disclosure is directed to an apparatus for cloud file processing. The apparatus may include an acquiring module to perform operations including acquiring a position of a first data packet read by the client in the target file as a reading position when a target file that a client intends to read from a cloud server is divided into a plurality of data packets. The operations of the acquiring module may also include acquiring a state of a second data packet not at the reading position in the target file as a peripheral state. The peripheral state is a read-completed state or an unread state. The apparatus may also include a sending module to perform operations including sending, by the client, a data pre-fetch request to the cloud server when the reading position and the peripheral state meet a preset condition. The data pre-fetch request is used to request to read, from the cloud server, a preset amount of data packets whose peripheral states are unread states in the target file.

As shown in the foregoing technical solutions, the cloud file processing method and apparatus, provided in the embodiments of the present disclosure, pre-fetch a preset amount of data packets from the cloud server when a read operation performed by a client on a target file in a cloud server meets a preset condition. The client can still access the pre-fetched data packets for the user to refer to even if network transmission between the client and the cloud server is delayed. Accordingly, the client can provide relevant data of the target file in time for the user to refer to even if network transmission between the client and the cloud server is delayed.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

To illustrate existing technologies and the technical solutions in the embodiments of the present disclosure, several drawings are briefly introduced in the following. These drawings show some embodiments of the present disclosure. A person having ordinary skill in the art may derive other drawings from these drawings without creative efforts.

DETAILED DESCRIPTION

Existing cloud file processing methods and apparatuses suffer from unreliable data transmission when certain network delays occur. The present disclosure provides a cloud file processing method and apparatus to solve the aforementioned problem.

To help those skilled in the art better understand, the technical solutions of the present disclosure are described clearly and completely through several embodiments with reference to the drawings. These embodiments are merely a part rather than all of the embodiments of the present disclosure. All other embodiments obtained by those of ordinary skill in the art based on the embodiments of the present disclosure without creative efforts shall fall within the protection scope of the present disclosure.

Figure 1:
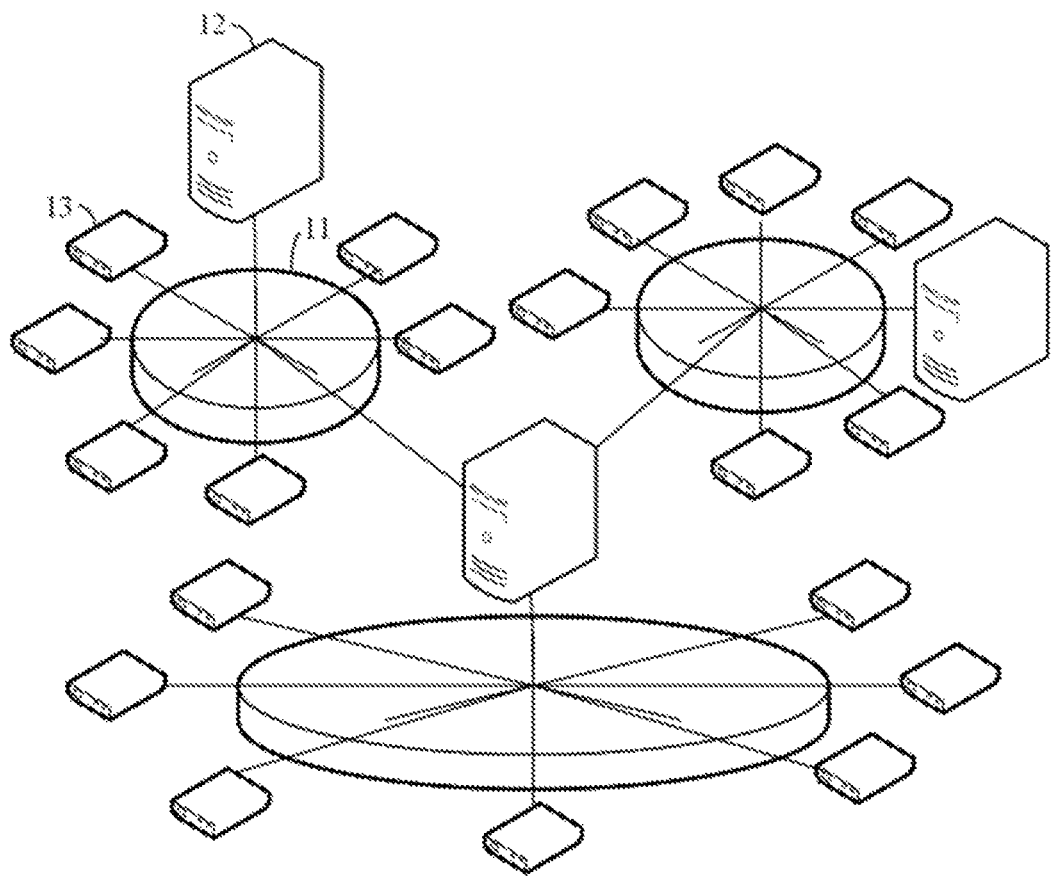
FIG. 1 is a schematic architectural diagram of a cloud system in an embodiment of the present disclosure.

FIG. 1 shows a schematic architectural diagram of an exemplary cloud system. As shown in FIG. 1, a cloud system includes one or more cloud servers 12, one or more clients 13, and a network 11 connecting cloud server 12 and client 13. Cloud server 12 may be a single server or a server cluster consisting of multiple servers. Client 13 may be a personal computer, a notebook computer, a radio telephone, a personal digital assistant (PDA), a smart watch, or any other form of computer or communications apparatus.

These servers and clients each include basic architectural components such as a bus, a processing apparatus, a storage apparatus, one or more input/output apparatuses, and a communications interface. The bus may include one or more wires to implement communication between components of the server and client. The processing apparatus may include various types of processors or microprocessors used to execute instructions and handle processes or threads. The storage apparatus may include a memory used to store dynamic information. A For example, A memory may include a random access memory (RAM), a static random access memory (SRAM), a read-only memory (ROM), a magnetic or optical recording medium, or a mass memory. The input apparatus may be a keyboard, a mouse, a stylus, a touch screen, a voice recognition apparatus, a bioassay apparatus, or the like. The output apparatus may be a display, a printer, a speaker, or the like used to output information. The communications interface is used to enable the server or the client to communicate with other systems or apparatuses. The communications interface may be connected to the network by means of wired connection, wireless connection, or optical connection, so that the client and the server may communicate with each other. Each network 11 may include a local area network (LAN), a wide area network (WAN), an intranet, the Internet, a mobile phone network, a virtual private network (VPN), a cellular network or other mobile communications networks, Bluetooth, NFC, or any combination thereof. The server and the client each include operating system software used to manage system resources and control execution of other programs, and application software or program instructions used to implement specific functions.

Figure 2:
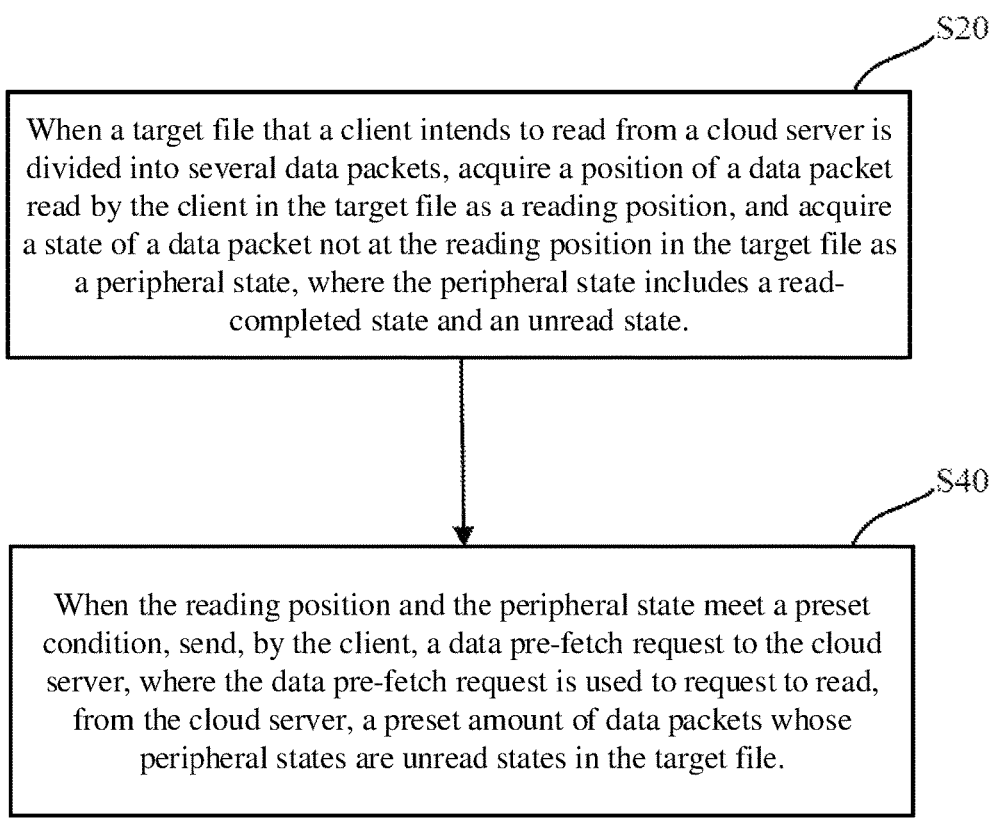
FIG. 2 is a flow chart of a cloud file processing method in an embodiment of the present disclosure.

FIG. 2 is a flow chart of a cloud file processing method in an embodiment of the present disclosure. An entity executing the cloud file processing method may be a cloud server 12, a client 13, or an application program on client 13.

In some embodiments, the cloud file processing method may include steps S20 and S40.

S20: When a target file that a client intends to read from a cloud server is divided into several data packets, the client acquires a position of a data packet read by the client in the target file as a reading position, and acquires a state of a data packet not at the reading position in the target file as a peripheral state, where the peripheral state includes a read-completed state and an unread state.

Cloud server 12 stores numerous files for a user to refer to or use. As used herein, a target file refers to a particular file read by or desired by the client. For example, if client 13 needs to read a video file located in cloud server 12, the target file is the video file.

A file in cloud server 12 may be divided into more than one data packet. In some embodiments, regardless of the type of a file in cloud server 12, a target file may be divided based on the size of the file. For example, a target file may be divided into data packets of the same or similar sizes. In that case, positions of the data packets in the target file may be definite. The position of a data packet in a target file may be a memory address or an indicator pointing to the location where the data packet is stored, or another form of indicator that can direct a client to access the data packet.

For example, if the target file is a 100 MB video file, the target file may be divided into 100 data packets each with a size of 1 MB. In this case, the position of each data packet in the video file may be definite. For example, when the first 1 MB data packet in the video file is at the first position of the video file, the positions of other data packets may also be deduced from that accordingly.

When reading the target file from cloud server 12, client 13 reads data packets of the target file in accordance with the bandwidth of network 11.

The amount of the target file read by client 13 from cloud server 12 each time may be referred to as a reading amount. For example, the reading amount may be determined as two data packets each time when client 13 can read two data packets from cloud server 12 each time. The reading amount may be adjusted in accordance with one or more factors including, but not limited to, the network bandwidth and the user's preference.

When client 13 reads a data packet from cloud server 12, a position of the read data packet in the target file is acquired, and the position is used as the reading position.

If client 13 reads more than one data packet from cloud server 12 in a time, these data packets may be grouped as a whole, and one of these data packets' positions may be selected as the reading position.

The reading position reflects the progress of client 13 in reading the target file. For example, when client 13 reads the target file for the first time, the reading position may be at the first position of the target file.

After the reading position is determined, a state of a data packet not at the reading position in the target file is acquired, and the state is used as a peripheral state.

The peripheral state of the data packet not at the reading position in the target file may be a read-completed state or may an unread state. The read-completed state indicates that client 13 has read the data packet from cloud server 12; the unread state indicates that client 13 has not yet read the data packet from cloud server 12.

In some embodiments, the peripheral state may reflect a reading history of client 13 regarding the target file. For example, if the peripheral states of all data packets not at the reading position are unread states, they indicate that the target file is read for the first time.

S40: Client 13 sends a data pre-fetch request to cloud server 12 when the reading position and the peripheral state meet a preset condition, where the data pre-fetch request is used to request to read, from the cloud server, a preset amount of data packets whose peripheral states are unread states in the target file.

In some embodiments, the preset conditions may include: an indication that the reading position is the first position of the target file; and an indication that the peripheral states of all the data packets are unread states.

When the reading position of the target file and the peripheral states of relevant data packets meet the preset condition, it may indicate that client 13 read the target file for the first time, read the target file from the beginning of the target file, and in some embodiments, read the target file in order.

The data pre-fetch request is used to request to read, from cloud server 12, a preset amount of data packets whose peripheral states are unread states in the target file. When the reading position and the peripheral state both meet the preset condition, client 13 may send the data pre-fetch request to the cloud server.

The preset amount may be, for example, a predetermined static value, or a dynamic value adjusted in accordance with the peripheral states of data packets.

In some embodiments, when the reading position and the peripheral state both meet the preset condition, the amount of read data packets read by client 13 each time from cloud server 12 may be acquired, and the preset amount may be calculated as a value that is double the amount of read data packets.

In some embodiments, the preset amount may be calculated as triple or other multiples of the amount of read data packets.

In some embodiments, the preset condition may be set to include: an indication that the reading position is not the first position of the target file; and an indication that the peripheral states of all data packets preceding the reading position are read-completed states.

When the reading position of the target file and the peripheral states of relevant data packets meet the preset condition, it indicates that client 13 has read the target file before. In one embodiment, client 13 reads the target file sequentially according to the order of data packets, and only reads data packets whose peripheral states are unread states. In this case, if the peripheral states of all data packets after the reading position are unread states and the peripheral states of all data packets preceding the reading position are read-completed states, the reading position may indicate the ending position of a previous reading operation performed by the client on the target file. It may be considered that client 13 reads the target file in a continuing manner.

In some embodiments, when the reading position and the peripheral state both meet the preset condition, client 13 may send a data pre-fetch request to the cloud server, where the data pre-fetch request is also used to request, from cloud server 12, a reading of a preset amount of data packets whose peripheral states are unread states in the target file.

A value that is double the number of pre-fetched data packets in a previous data pre-fetch request may be calculated as the preset amount.

In some embodiments, the preset condition may be set to include: an indication that the reading position is not the first position of the target file; and an indication that the peripheral states of some of data packets preceding the reading position are read-completed states.

In some embodiments, the target file may be a multi-stream file, such as a movie file that includes an audio data stream and a video data stream. A target file of multi-stream type may be divided into data packets as follows: the audio data stream may be divided into several audio data packets, the video data stream may be divided into several video data packets, and the data packets of one type may be arranged directly after the data packets of the other type. When reading a target movie file, the client may read several audio data packets, followed by several video data packets, and may then resume the reading of several additional audio data packets. Reading may be performed in such alternating manner such that the client can simultaneously provide audio data packets and corresponding video data packets for the user to refer to.

When the reading position and the peripheral state both meet the preset condition, it indicates that client 13 is reading a file of a multi-stream type, and that client 13 has finished reading data packets of one type and is now reading data packets of another type for the first time. It may be considered that client 13 reads the target file in multi-stream sequential order.

The number of data packets preceding the reading position and of which the peripheral states are read-completed states may be used as the preset amount.

In the cloud file processing method and apparatus provided by the embodiments of the present disclosure, by defining different preset conditions, three modes in which client 13 reads the target file are defined: sequential reading, reading in a continuing manner, and multi-stream sequential reading. In these reading modes, a preset amount of data packets are pre-fetched from the cloud server by the client. The client can still access the pre-fetched data packets for the user even if network transmission between the client and the cloud server is delayed. Accordingly, the client can provide relevant data of the target file in time for the user to refer to. The client may not send the data pre-fetch request to the cloud server if the client is not in the three reading modes described above, to reduce the waste of resources.

In these three reading modes, a certain number of data packets are pre-fetched from the cloud server 10 because the user is intent on reading content of more data packets in the target file. When the client really needs to provide more data packets of the target file, the client may only need to provide the pre-fetched data packets for the user to refer to. Moreover, different preset amounts may be set in different reading modes. User experience may be improved by adjusting amounts of pre-fetched data packets in accordance with the user's intention to read the target file.

Figure 3:
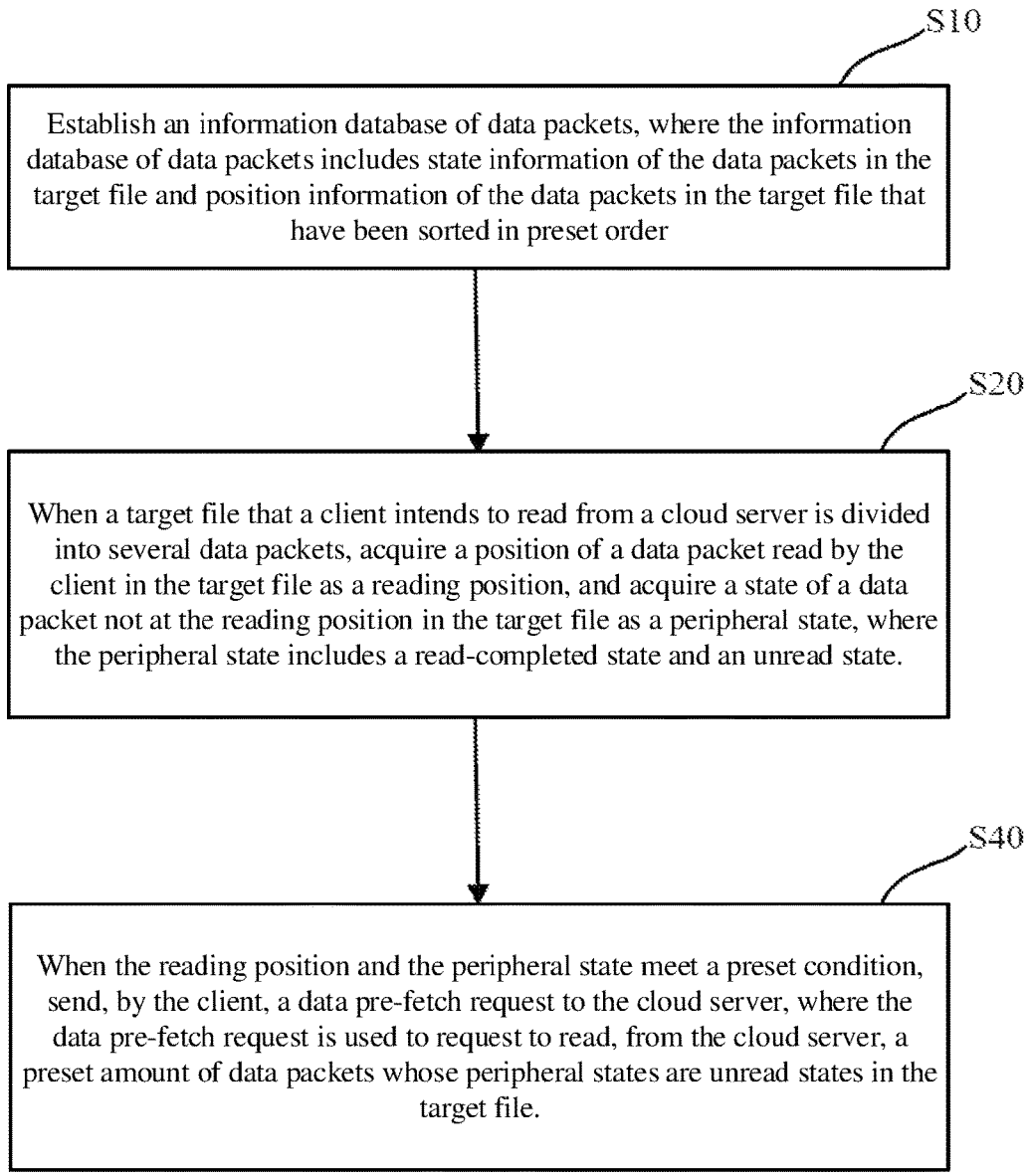
FIG. 3 is a flow chart of a cloud file processing method in another embodiment of the present disclosure.

FIG. 3 shows another exemplary embodiment of the present disclosure. This embodiment provides a cloud file processing method that is different from the aforementioned embodiment. For example, the method of FIG. 3 may further include the following steps prior to step S20:

S10: Establish an information database of data packets, where the information database of data packets includes state information of the data packets in the target file and position information of the data packets in the target file that have been sorted in a preset order.

After the target file in cloud server 12 is divided into several data packets, the state information and position information of each data packet are associated with the target file, and are jointly stored in the information database of data packets.

In a subsequent process of executing step S20, the position and state of a desired data packet may be rapidly obtained by querying the information database of data packets of the target file.

In some embodiments, an independent information database of data packets may be established for each target file. The information database of data packets may be implemented by means of a radix tree, where the data packets are disposed on branches of the radix tree, to rapidly obtain the position and state of a data packet in the query.

Moreover, the information database of data packets is updated according to the the state information of these data packets. As the cloud file processing method progresses, the state information of a data packet in the information database is updated whenever the state information of the data packet changes. For example, after one data packet is read, the state information of the data packet is updated from an unread state to a read-completed state.

Figure 4:
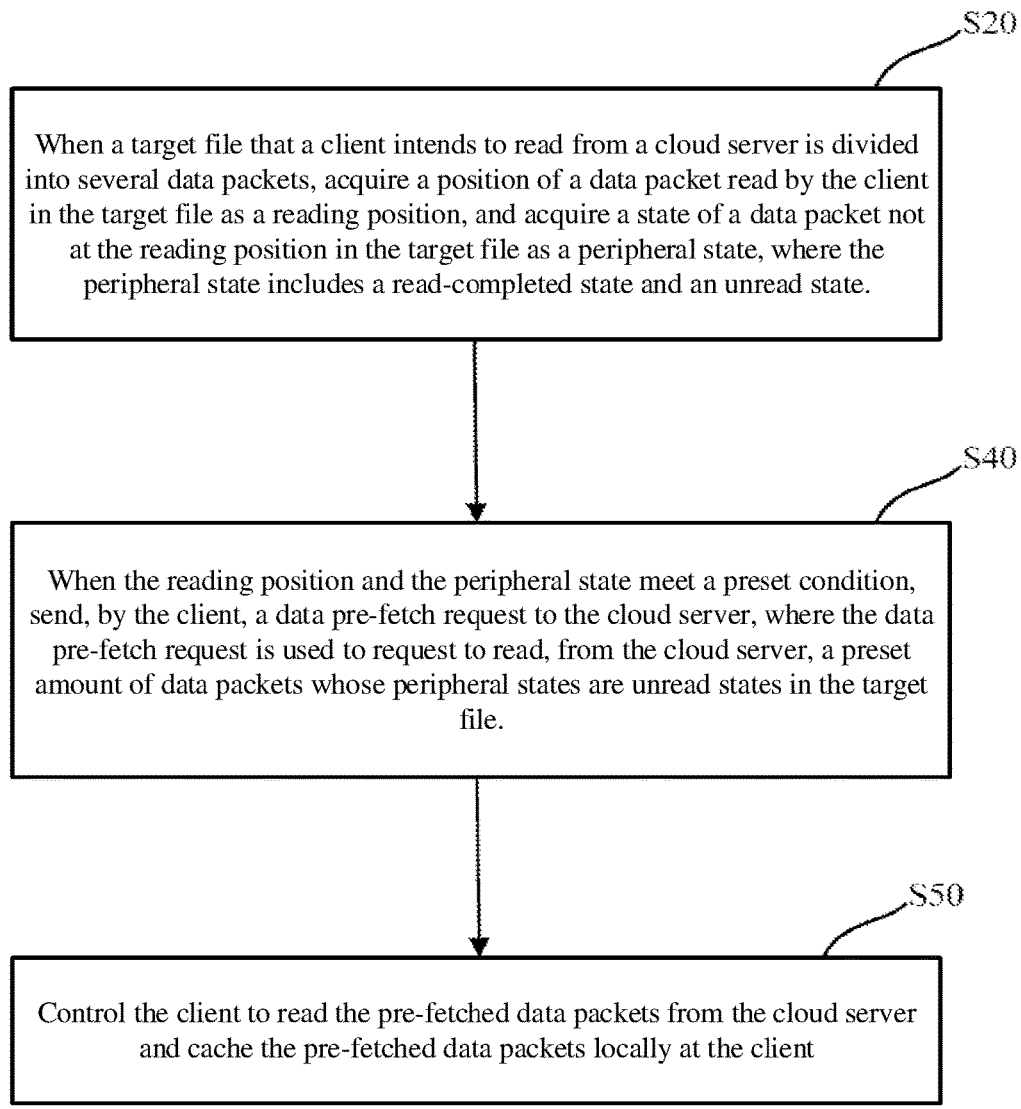
FIG. 4 is a flow chart of a cloud file processing method in another embodiment of the present disclosure.

FIG. 4 illustrates another embodiment of the present disclosure. This embodiment provides a cloud file processing method which is different from the aforementioned embodiment. For example, the method of FIG. 4 may further include, after step 40, the following step S50:

S50: Control client 13 to read the pre-fetched data packets from cloud server 12 and cache the pre-fetched data packets locally at the client.

In some embodiments, the data packets that client 13 reads from cloud server 12 and the data packets that client 13 pre-fetches from cloud server 12 are processed and stored individually in different download processes and the two do not interfere with each other.

Client 13 may sort the pre-fetched data packets based on the access order of these data packets. For example, local data packets may form a data packet queue in which a data packet accessed at an earlier moment may be disposed at the end of the data packet queue, and a data packet accessed at a more recent moment may be disposed at the beginning of the data packet queue.

In some embodiments, when a data packet's access is prior to a preset moment, the data packet may be cleared locally in order to save local storage space.

Figure 5:
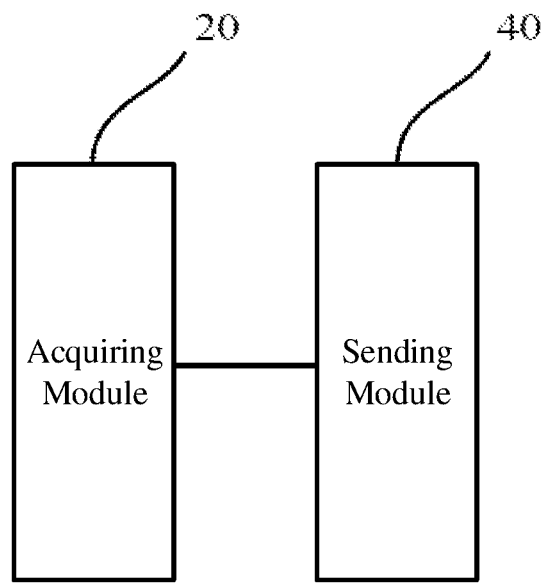
FIG. 5 is a module diagram of a cloud file processing apparatus in an embodiment of the present disclosure.

FIG. 5 shows a module diagram of a cloud file processing apparatus in an embodiment of the present disclosure. Because the apparatus is based on the aforementioned processing method, reference may be made to the method described above for specific details of the apparatus.

In some embodiments, the cloud file processing apparatus may include:

an acquiring module 20: when a target file that a client intends to read from a cloud server is divided into several data packets, acquire a position of a data packet read by the client in the target file as a reading position, and acquire a state of a data packet not at the reading position in the target file as a peripheral state. The peripheral state includes a read-completed state and an unread state; and a sending module 40: send a data pre-fetch request to the cloud server when the reading position and the peripheral state meet a preset condition, where the data pre-fetch request is used to request to read, from the cloud server, a preset amount of data packets whose peripheral states are unread states in the target file.

For the purposes of this disclosure, it is appreciated that each of these modules (and any corresponding sub-modules) can be packaged functional hardware unit designed for use with other components (e.g., portions of an integrated circuit) and/or a part of a program (stored on a computer readable medium) that performs a particular function of related functions. For example, if the disclosed "modules" are implemented in software, they may be stored in a memory associated with system. Processors, I/O devices, and memory devices may be used to perform processes to implement and facilitate operations of the modules. Thus, the modules may include code instructions executable by one or more processors, alone or in various combinations with other modules disclosed in this or other embodiments. If the disclosed "modules" are implemented in hardware, they may comprise an embedded system or other dedicated hardware configured by machine code, assembly code, or the like to interact with other modules to perform functions consistent with disclosed embodiments.

In some embodiments, the target file is divided into several data packets having the same size.

In some embodiments, the apparatus may further include a database establishment module, specifically configured to:

establish an information database of data packets, where the information database of data packets may include state information of the data packets in the target file and position information of the data packets that have been sorted in preset order; and the acquiring module 20 may be specifically configured to:

obtain, according to the position information in the information database of data packets, the position of the data packet read by the client in the target file; and acquire, according to the state information in the information database of data packets, the state of the data packet not at the reading position in the target file.

In some embodiments, the preset condition may include:

an indication that the reading position is the first position of the target file; and an indication that the peripheral states of all the data packets are unread states.

In some embodiments, the amount of data packets in the target file that are read by the client from the cloud server each time may be used as a reading amount, and a value that is double of the reading amount may be calculated as the preset amount.

In some embodiments, the preset condition may include:

an indication that the reading position is not the first position of the target file; and an indication that the peripheral states of all data packets located in front of the reading position are read-completed states.

In some embodiments, a value that is double of the amount of pre-fetched data packets in a previous data pre-fetch request may be calculated as the preset amount.

In some embodiments, the preset condition may include:

an indication that the reading position is not the first position of the target file; and an indication that the peripheral states of some of data packets located in front of the reading position are read-completed states.

In some embodiments, the amount of the data packets which are located in front of the reading position and of which the peripheral states are read-completed states may be used as the preset amount.

In some embodiments, the method may further include a data caching module, configured to:

control the client to read the pre-fetched data packets from the cloud server; and cache the pre-fetched data packets locally.

In some embodiments, the data caching module may be specifically configured to:

sort the pre-fetched data packets according to the access order of the pre-fetched data packets.

In the cloud file processing apparatus provided by the embodiments of the present disclosure, when a read operation performed by a client on a target file in a cloud server meets a preset condition, a preset amount of data packets may be pre-fetched from the cloud server. The client may be access these pre-fetched data packets and provide them to a user even if network transmission between the client and the cloud server is delayed. Accordingly, the client may provide relevant data of the target file for the user to refer to.

The present invention is described with reference to the method and device (system) of the embodiments of the present invention. It should be understood that each process and/or block in the flow chart and/or block diagram and a combination of processes and/or blocks in the flow chart and/or block diagram may be implemented by using computer program instructions in combination with an information sensing device. These computer program instructions may be provided to a computer, an application-specific computer, an embedded processor or a processor of other programmable data processing devices to generate a machine, so that the instructions, which are executed by the computer or the processor of other programmable data processing devices, in coordination with the information sensing device generate an apparatus for implementing functions specified in one or more processes in the flow chart and/or in one or more blocks in the block diagram.

These computer program instructions may also be stored in a computer readable memory capable of guiding a computer or other programmable data processing devices to work in a particular manner, so that the instructions stored in the computer readable memory generate a product including an instruction apparatus, where the instruction apparatus implements functions specified in one or more processes in the flow chart and/or in one or more blocks in the block diagram.

These computer program instructions may also be loaded to a computer or other programmable data processing devices, so that a series of operation steps are executed on the computer or other programmable devices to generate computer-implemented processing, and therefore the instructions executed on the computer or other programmable devices provide steps for implementing functions specified in one or more processes in the flow chart and/or in one or more blocks in the block diagram.

In a typical configuration, a computing device includes one or more central processing units (CPU), an input/output interface, a network interface, and a memory.

The memory may include forms such as a non-permanent memory, a random access memory (RAM) and/or a non-volatile memory among computer readable media, for example, a read-only memory (ROM) or a flash random access memory (flash RAM). The memory is an example of the computer readable media.

The computer readable media include permanent and non-permanent, mobile and immobile media, and can implement information storage by using any method or technology. Information may be a computer readable instruction, a data structure, a program module, or other data. Examples of the storage media of a computer include, but are not limited to such non-transitory computer readable mediums such as: a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storage, one or more registers, one or more caches, a cassette tape, a magnetic tape disk storage or other magnetic storage devices, or other non-transmission media, which may be used to store information accessible to the computer device. According to the definition herein, the computer readable media do not include transitory computer readable media, for example, modulated data signals and carriers.

It should also be noted that, the terms "include", "comprise" or any other variation thereof intend to cover non-exclusive inclusion, so that a process, method, product, or device including a series of elements not only includes those elements but also includes other elements that are not listed explicitly, or further includes intrinsic elements of the process, method, product or device. Without more restrictions, an element modified by the phrase "including a . . . " does not preclude the process, method, product or device including the element from further including other identical elements.

The above description is merely embodiments of the present disclosure, but is not intended to limit the present disclosure. For those skilled in the art, the present disclosure can have various changes and variations. Any modification, equivalent replacement, and improvement made without departing from the spirit and principle of the present disclosure shall fall in the scope of the claims of the present disclosure.

It is intended that the disclosure and examples be considered as exemplary only, with a true scope and spirit of disclosed embodiments being indicated by the following claims.

What is claimed is:

1. A method for processing cloud files containing a target file, the method comprising:
   when the target file that a client intends to read from a cloud server is divided into a plurality of data packets:
   acquiring a position of a first data packet read by the client in the target file as a reading position;
   acquiring a state of a second data packet not at the reading position in the target file as a peripheral state, wherein the peripheral state is a read-completed state or an unread state; and
   sending a data pre-fetch request by the client to the cloud server when the reading position and the peripheral state meet a preset condition,
   wherein the data pre-fetch request is used to request to read, from the cloud server, a preset amount of data packets whose peripheral states are unread states in the target file.

2. The method of claim 1, wherein:
   the target file is divided into a plurality of data packets of equal size.

3. The method of claim 2, further comprising:
   establishing, before the client reads from the cloud server the target file, an information database of data packets, wherein the information database includes state information of the data packets of the target file and position information of the data packets of the target file that have been sorted in a preset order, and
   wherein acquiring the position of the first data packet includes acquiring the position of the first data packet according to the position information of the first data packet in the information database, and acquiring the state of the second data packet includes acquiring the state of the second data packet according to the state information of the second data packet in the information database.

4. The method of claim 1, wherein the preset condition includes:
   the reading position is the first position of the target file; and
   the peripheral states of all the data packets are unread states.

5. The method of claim 4, further comprising:
   acquiring the amount of data packets in the target file that are read by the client from the cloud server each time as a reading amount, and
   setting the preset amount to be a value that is double the reading amount.

6. The method of claim 1, wherein the preset condition includes:
the reading position is not the first position of the target file; and
the peripheral states of all data packets located in front of the reading position are read-completed states.

7. The method of claim 6, wherein:
a double of the amount of pre-fetched data packets in a previous data pre-fetch request is used as the preset amount.

8. The method of claim 1, wherein the preset condition includes:
the reading position is not the first position of the target file; and
the peripheral states of a part of data packets located in front of the reading position are read-completed states.

9. The method of claim 8, wherein:
the amount of the data packets which are located in front of the reading position and of which the peripheral states are read-completed states is used as the preset amount.

10. The method of claim 1, further comprising,
controlling the client to read the pre-fetched data packets from the cloud server after sending the data pre-fetch request by the client to the cloud server; and
caching the pre-fetched data packets locally at the client.

11. The method of claim 10, wherein caching the pre-fetched data packets locally at the client includes:
sorting the pre-fetched data packets according to the access order of the pre-fetched data packets; and
caching the sorted pre-fetched data packets locally at the client.

12. An apparatus for processing cloud files, comprising:
a memory storing a set of instructions; and
one or more processors configured to execute the set of instructions to cause the apparatus to perform operations including:
when a target file that a client intends to read from a cloud server is divided into a plurality of data packets:
acquiring a position of a first data packet read by the client in the target file as a reading position;
acquiring a state of a second data packet not at the reading position in the target file as a peripheral state, wherein the peripheral state is a read-completed state or an unread state; and
sending a data pre-fetch request by the client to the cloud server when the reading position and the peripheral state meet a preset condition,
wherein the data pre-fetch request is used to request to read, from the cloud server, a preset amount of data packets whose peripheral states are unread states in the target file.

13. The apparatus of claim 12, wherein:
the target file is divided into a plurality of data packets of equal size.

14. The apparatus of claim 12, wherein the one or more processors are configured to execute the set of instructions to cause the apparatus to further perform operations including:
establishing an information database of data packets, wherein the information database includes state information of the data packets of the target file and position information of the data packets of the target file that have been sorted in a preset order, and
wherein the operation of acquiring the position of the first data packet includes acquiring the position of the first data packet according to the position information of the first data packet in the information database, and the operation of acquiring the state of the second data packet includes acquiring the state of the second data packet according to the state information of the second data packet in the information database.

15. The apparatus of claim 12, wherein the preset condition includes:
the reading position is the first position of the target file; and
the peripheral states of all the data packets are unread states.

16. The apparatus of claim 15, wherein the one or more processors are configured to execute the set of instructions to cause the apparatus to further perform operations including:
acquiring the amount of data packets in the target file that are read by the client from the cloud server each time as a reading amount, and
setting the present amount to be a value that is double the reading amount.

17. The apparatus of claim 12, wherein the preset condition includes:
the reading position is not the first position of the target file; and
the peripheral states of all data packets located in front of the reading position are read-completed states.

18. The apparatus of claim 17, wherein:
a double of the amount of pre-fetched data packets in a previous data pre-fetch request is used as the preset amount.

19. The apparatus of claim 12, wherein the preset condition includes:
the reading position is not the first position of the target file; and
the peripheral states of a part of data packets located in front of the reading position are read-completed states.

20. The apparatus of claim 19, wherein:
the amount of the data packets which are located in front of the reading position and of which the peripheral states are read-completed states is used as the preset amount.

21. The apparatus of claim 12, wherein the one or more processors are configured to execute the set of instructions to cause the apparatus to further perform operations including:
controlling the client to read the pre-fetched data packets from the cloud server after sending the data pre-fetch request by the client to the cloud server; and
caching the pre-fetched data packets locally at the client.

22. The apparatus of claim 21, wherein the operation of caching the pre-fetched data packets includes:
sorting the pre-fetched data packets according to the access order of the pre-fetched data packets; and
caching the sorted pre-fetched data packets locally at the client.

23. A non-transitory computer-readable storage medium that stores a set of instructions that is executable by at least one processor of an apparatus to cause the apparatus to perform a method for processing cloud files containing a target file, the method comprising:
when the target file that a client intends to read from a cloud server is divided into a plurality of data packets:
acquiring a position of a first data packet read by the client in the target file as a reading position;

acquiring a state of a second data packet not at the reading position in the target file as a peripheral state, wherein the peripheral state is a read-completed state or an unread state; and sending a data pre-fetch request by the client to the cloud server when the reading position and the peripheral state meet a preset condition, wherein the data pre-fetch request is used to request to read, from the cloud server, a preset amount of data packets whose peripheral states are unread states in the target file.

\* \* \* \* \*